US006761864B2

(12) United States Patent
Jasra et al.

(10) Patent No.: US 6,761,864 B2
(45) Date of Patent: Jul. 13, 2004

(54) PROCESS FOR GENERATION OF FINELY DIVIDED CALCIUM CARBONATE FROM CALCIUM CARBONATE RICH INDUSTRIAL BY-PRODUCT

(75) Inventors: Raksh Vir Jasra, Gujarat (IN); Pravinchandra Mahasukhray Oza, Gujarat (IN); Rajesh Shantilal Somani, Gujarat (IN); Jatin Rameshchandra Chunnawala, Gujarat (IN); Mrunal Vinodbhai Sheth, Gujarat (IN); Vikram Vinodrai Thakkar, Gujarat (IN); Yogiraj Mansukhlal Badheka, Gujarat (IN); Jayalekshmy Ayyer, Gujarat (IN); Virendra Bhikhabhai Patel, Gujarat (IN)

(73) Assignees: Council of Scientific and Industrial Research, New Delhi (IN); Gujarat Narmada Valley Fertilizer Co. Ltd., Gujarat (IN)

( * ) Notice: Subject to any disclaimer, the term of this patent is extended or adjusted under 35 U.S.C. 154(b) by 191 days.

(21) Appl. No.: 09/999,480

(22) Filed: Oct. 31, 2001

(65) Prior Publication Data

US 2003/0099591 A1 May 29, 2003

(51) Int. Cl.⁷ ................................................ C01F 11/18

(52) U.S. Cl. ........................................ 423/265; 423/430
(58) Field of Search .......................... 423/265, DIG. 3, 423/430; 106/474

(56) References Cited

U.S. PATENT DOCUMENTS 5,711,802 A * 1/1998 Theil

* cited by examiner

Primary Examiner—Stuart Hendrickson
(74) Attorney, Agent, or Firm—Drinker Biddle & Reath LLP

(57) ABSTRACT

An environmentally friendly process for the production of finely divided calcium carbonate suitable for industrial application from a calcium carbonate-rich by-product of nitrophosphate fertilizer plant by adopting purification steps of thermal treatment, pulverization and coating using an emulsion of a fatty acid or it's a fatty acid derivatives.

10 Claims, 1 Drawing Sheet

US 6,761,864 B2

PROCESS FOR GENERATION OF FINELY DIVIDED CALCIUM CARBONATE FROM CALCIUM CARBONATE RICH INDUSTRIAL BY-PRODUCT

FIELD OF THE INVENTION

The present invention relates to a process for purification of calcium carbonate-rich by-product generated in an industrial process, particularly in nitrophosphate plants in the fertilizer industry, and converting the by-product to finely divided calcium carbonate.

The purification is carried out by thermal treatment of wet calcium carbonate-rich by-product, as available from a nitrophosphate plant. The thermal treatment is applied at a specific temperature, so as to remove moisture and volatile matter, and to decompose or sublime impurities present such as ammonium and nitrate salts. Special care is taken not to decompose the calcium carbonate. In addition, the finely divided calcium carbonate obtained may be coated by using an emulsion or solution of a fatty acid or of a salt of a fatty acid.

Calcium carbonate is used in the manufacture of paper, rubber, plastics, glass, textiles, putties, chalks, sealant, adhesives, paints, inks, varnishes, food, cosmetics, dentifrices, chemicals and pharmaceuticals.

Calcium carbonate produced according to the process of this invention is particularly suitable for use as filler in rubber, paint, plastics and PVC.

BACKGROUND OF THE INVENTION

Several physical and chemical processes have been suggested for removal of impurities from waste calcium carbonate. Physical processes requires drying and grinding, to a fineness sufficient that impurities can be removed by screening, classification, magnetic separation, hydrocyclone separation or floatation. The disadvantages associated with these physical methods of removing impurities are the requirement of specialized machines/devices and the maintenance of the specialized machines and devices. Moreover, these processes are complex and difficult to administer. Other disadvantages of physical processes include unpredictable process efficiencies, variation in the quantities of impurities removed and the expenses associated with employing such physical techniques for removing impurities.

Leaching or bleaching the dried and ground calcium carbonate with chemicals such as halogen, oxygen-containing acids of a halogen or salts thereof, ozone, hydrogen peroxide etc. are described in British patent No. 1285891 (1972) as a chemical purification process. Disadvantages of chemical processes include the requirement of special chemicals, and the number of unit operations to perform the treatments. In addition, the use of a single chemical may not be suitable to remove all the impurities. Removal and separation of excess chemicals remaining after the chemical process is another disadvantage.

Another previously known and widely used method for the treatment of waste containing calcium carbonate, generally known as lime sludge, is re-burning. Reburning consists of burning within the kiln and removing the burned lime after cooling in a material cooler fitted immediately after the kiln. The burned lime reaches a temperature of 1000–1200° C. during the treatment in the kiln. Many technological improvements have been made in kiln design. Such improvements include incorporating a drier crusher, e.g., a hammer mill type crusher, which is mounted before the kiln and cyclone separators. Such a plant, which is also known in other contexts, is described by L. Lenado and Ramon Aguillon (EP 0041113, 1982). The Lenado process is associated with many disadvantages, such as the incorporation of a new machine, the maintenance of the new machine, necessity of special steel which can withstand high temperature, high dust loss, the requirement of cyclone separators and caking in ducts due to the dust from the kiln being sticky in the temperature range 600–700° C. The product obtained is calcium oxide which must be further processed by hydration and carbonation, to produce industrially useful calcium carbonate. Otherwise, as the Lenado process is practiced, the product is recycled in a causticizing process in producing paper pulp.

Mattelmaki discloses a process (U.S. Pat. No. 5,110,567) wherein the dryer crusher has been replaced with a pneumatic drying device, which lowers the final temperature of the exhaust gas. However, this process has the main disadvantage that the material processed is not free flowing. The material demonstrates a dry sticking tendency which often causes ring formation in the preheating zone of the rotary kiln. In addition, this process produces calcium oxide and not calcium carbonate.

Mehaffey et al, (U.S. Pat. No. 4,892,649) disclose a process for purifying calcium carbonate ore by the removal of silicate impurities from the ore using reverse floatation. The process achieves high yields and low acid insoluble content in the calcium carbonate product by employing novel collectors which comprise organo-nitrogen compounds such as quaternary ammonium compounds. The disadvantages of this process are that a floatation unit is required which must be operated continuously. Disposal of separated impurities and removal of unused quaternary compounds raises concerns about pollution resulting from this process.

Theil Jorgen (U.S. Pat. No. 5,711,802) discloses a method and a processing plant for treatment of lime sludge formed by the causticizing process during the manufacture of paper pulp. According to the Theil method, the lime sludge is dried, pulverized and then preheated in a kiln at a predetermined temperature in the range 400–600° C. to obtain dry and poulvurized calcium carbonate. The dried material thus obtained is further calcined/burned in any type of suitable kiln to produce quick lime which in turn can be reused in causticizing process. The drawbacks associated with this invention are that the lime sludge must be dried, pulverized and preheated prior to calcination. The product obtained is calcium oxide and therefore can not be used in rubber, paint, plastics and PVC.

Drummand (U.S. Pat. No. 5,690,897), describes a method for purification of calcium carbonate by lowering the iron content. The method involves addition of an iron chelating agent to an aqueous calcium carbonate slurry, reducing the pH of the slurry by employing $CO_2$ containing gas, while maintaining the slurry in a temperature range of 20 to 100° C. The resulting slurry is stirred, filtered, washed and dried. The disadvantage of this invention is that it is limited to the removal of iron impurities. Moreover, continuously passing $CO_2$ gas and maintaining pH at constant value, while simultaneously maintaining the temperature is both difficult to accomplish and uneconomical.

Price et. al. (U.S. Pat. No. 4,793,985, disclose a process for producing ultra fine ground calcium carbonate in which a dry feed limestone is slurried to a solids content of 15 to 60% by weight. The slurry is dispersed with an organic polyacrylate (DISPEX N40) and other macromolecular dispersing agents. The dispersed slurry is fed to an attrition mill where it is bead ground to produce a material wherein 50–70% of the particles are less than 2 micron. The ground calcium carbonate is classified in a centrifuge into a product stream having from 70–99% of its particles less than 2 microns and an underflow stream of larger particles. The product is then treated with ozone which serves not only to increase the brightness of the product but to return the slurry to a non-dispersed state. The calcium carbonate slurry is then dewatered to produce a product containing 58–69% by weight solids, which is suitable for preparing a higher solids content slurry or for spray drying. The drawbacks associated with the Price process is that, ozone being a rare gas, is utilized for merely for improving brightness. Use of ozone also adds to the production cost.

Bunger et al. (U.S. Pat. No. 5,846,500) disclosed a process for the purification of calcium hydroxide using a highly dilute aqueous solution for dissolution of calcium hydroxide followed by settling and filtration for the removal of impurities. The Bunger process is applied particularly to removing impurities from hydrated carbide lime, which is used subsequently as a feed stock for a high value calcium carbonate. Precipitated calcium carbonate is formed by reaction of the purified calcium hydroxide solution with $CO_2$ in a plug-flow reactor system. The drawbacks of this invention is that due to the very low water solubility of calcium hydroxide high dilution is required to dissolve all of the calcium hydroxide. Moreover, settling and filtration steps involving large volumes of hydroxide solution becomes difficult and requires settling tanks and filtration units which serve to make the process economically unattractive.

It is evident from the above facts that the need exists for development of a new process for the generation of calcium carbonate from industrial by-products rich in calcium carbonate.

SUMMARY OF THE INVENTION

The work described in the present invention has been carried out to purify the calcium carbonate rich by-product generated in a nitrophosphate plant in a fertilizer or other industry so as to convert the by-product to an industrially useful value-added product.

The present invention provides a process for purification of calcium carbonate-rich by-product generated in industrial processes, which process obviates the drawbacks detailed above.

The present invention also develops an alternative source to limestone for producing finely divided calcium carbonate useful for commercial applications.

The present invention also provides a continuous process for the purification of calcium carbonate-rich by-product having a fine particle size from 20 to 150 microns as generated in a nitrophosphate fertilizer plant, in order to minimize the pollution caused by such solid waste and thereby improve the quality of the environment.

The present invention also provides a thermal treatment method for purification of calcium carbonate-rich by-product generated in a nitrophosphate fertilizer plant.

The methods of the present invention produce purified and coated finely divided calcium carbonate useful as filler in paints, plastics, rubber and PVC by profitably The methods of the present invention produce purified and coated finely divided calcium carbonate useful as filler in paints, plastics, rubber and PVC by profitably utilizing the calcium carbonate rich by-product generated in a nitrophosphate fertilizer plant.

The present invention also provides pollution abatement measures for nitrophosphate fertilizer plants and a calcium carbonate-rich by-product treatment unit.

In one embodiment of the invention, there is provided a process for the production of finely divided calcium carbonate from a calcium carbonate-rich by-product, the claimed process comprising:

(a) continuously feeding a wet calcium carbonate-rich by-product into a rotary dryer to remove moisture and volatile matter, and to decompose or sublime ammonium compounds present as impurities in the by-product, to generate a rotary dryer treated material:
   wherein the calcium carbonate-rich by-product:
      contains up to 25% moisture,
      has a particle size from 20 to 150 microns, and
      is fed to the rotary dryer at a feed rate from 5 to 20 kg/h using a screw feeder with a rotation speed from 10 to 40 revolutions per minute; and
   wherein the rotary dryer
      is preheated and maintained at a temperature from 250 to 400° C., preferably from 250 to 350° C.;
      has an angle of inclination from 1.0 to 1.4 degrees; and
      has a rotation speed from 1 to 4 RPM, preferably from 2 to 3 RPM;

(b) routing water vapor, volatile matter, and ammonia gas liberated from the calcium carbonate-rich by-product in the rotary dryer to a water tank for scrubbing;
   wherein the rotary drum heater is preheated and maintained at a temperature from 500 to 600° C. has an angle of inclination from 1.0 to 1.4 degrees, and has a rotation speed from 1 to 4 RPM;

(d) after a residence time in the rotary drum heater from 30 to 90 minutes, preferably from 30 to 45 minutes, outputting the rotary drum heater treated material to a material cooler to cool the rotary drum heater treated material to near ambient temperature;

(e) outputting the cooled material from the material cooler at an outlet rate from 2 to 20 kg/hour, preferably from 5 to 15 kg/hour, which outlet rate is synchronized with the outlet rate for material output from the rotary drum heater;

(f) grinding the cooled material in a pin/attrition mill to a particle size from 1 to 20 microns;

(g) dispersing the ground material in a slurry tank to generate a slurry having from 40 to 55% solids content;

(h) heating the slurry to a temperature less than 95° C. with agitation;

(i) adding to the heated slurry a hot emulsion or solution of fatty acid derivatives or salts of fatty acid derivatives to form a mixture, wherein the fatty acid derivatives or salts of fatty acid derivatives have a carbon chain length from 16 to 20 carbons, and are added to the slurry in an amount sufficient to obtain a final product comprising from 3 to 4% of the fatty acid derivative or fatty acid derivative salt;

(j) allowing the mixture to cool to a temperature less than 50° C.;

(k) removing water soluble components from the mixture to generate a product; and (l) drains and pulverizing the product to obtain finely divided coated calcium carbonate.

In one sub-embodiment of the invention, the screw feeder which feeds the calcium carbonate-rich by-product to the rotaty dryer in step (a) is rotated at a rate of 5 to 20 RPM.

In another sub-embodiment of the invention, the rotary dryer in step (a) is heated to a temperature from 260 to 400° C.

In another sub-embodiment of the invention, the rotary dryer in step (a) has an angle of inclination from 1.08 to 1.4 degrees In one sub-embodiment of the invention, the rotary drum heater in step (c) is preheated and maintained at a temperature from from 550 to 650° C. In another sub-embodiment of the invention, the rotary drum heater in step (c) is preheated and maintained at a temperature from from 500 to 600° C.

In one sub-embodiment of the invention, the outlet rate of material from the rotary drum heater in step (e) is obtained by rotating a jacketed screw conveyer type material cooler at a rate of 5 to 15 RPM.

In one sub-embodiment of the invention, the hot emulsion or solution of fatty acid derivatives or salts of fatty acid derivatives in step (i) is from 70 to 90° C. In another sub-embodiment of the invention, the emulsion or solution of fatty acid derivatives or salts of fatty acid derivatives in step (i) is from 85 to 95° C.

In one sub-embodiment of the invention, the hot emulsion or solution of fatty acid derivatives or salts of fatty acid derivatives in step (i) is added to the slurry in an amount sufficient to obtain a final product comprising from 3 to 4% of the fatty acid derivative or fatty acid derivative salt.

In another sub-embodiment of the invention, the hot emulsion or solution of fatty acid derivatives or salts of fatty acid derivatives in step (i) is added to the slurry in an amount sufficient to obtain a final product comprising from 2 to 3.5% of the fatty acid derivative or fatty acid derivative salt.

In another sub-embodiment, the material in step (f) is ground in the pin/attrition mill to a microparticulate size of 10 to 20 microns.

In another sub-embodiment of the invention, the slurry in step (h) is heated to a temperature from 85 to 95° C.

In another sub-embodiment of the invention the temperature of the cooled material in step (d) is less than 35° C.

In another sub-embodiment of the invention, the mixture of the slurry of finely divided calcium carbonate and the hot emulsion or solution of fatty acid derivatives or salts of fatty acid derivatives in step (j) to a temperature from 20 to 45° C.

Heat treatment, as described in the present invention, significantly purifies the calcium carbonate-rich by-product generated in a nitrophosphate fertilizer plant to generate purified calcium carbonate. The calcium carbonate-rich by-product, having a moisture content up to 25%, can be fed at suitable rates through the system without adversely affecting the quality of the end product. In addition, the cooler outlet material can be ground to obtain the fineness as required for end applications. The process of coating the pulverized/finely ground material as applied herein provides a means of making the material suitable for rubber, paint, plastics and PVC.

In addition, the process of the present invention prevents air pollution by avoiding dusting with the use of indirect heating and by scrubbing the liberated ammonium and nitrogen compounds in water. More-over, the process remarkably increases whiteness/brightness of the product.

BRIEF DESCRIPTION OF DRAWINGS

In the drawing accompanying this specification.

Figure 1:
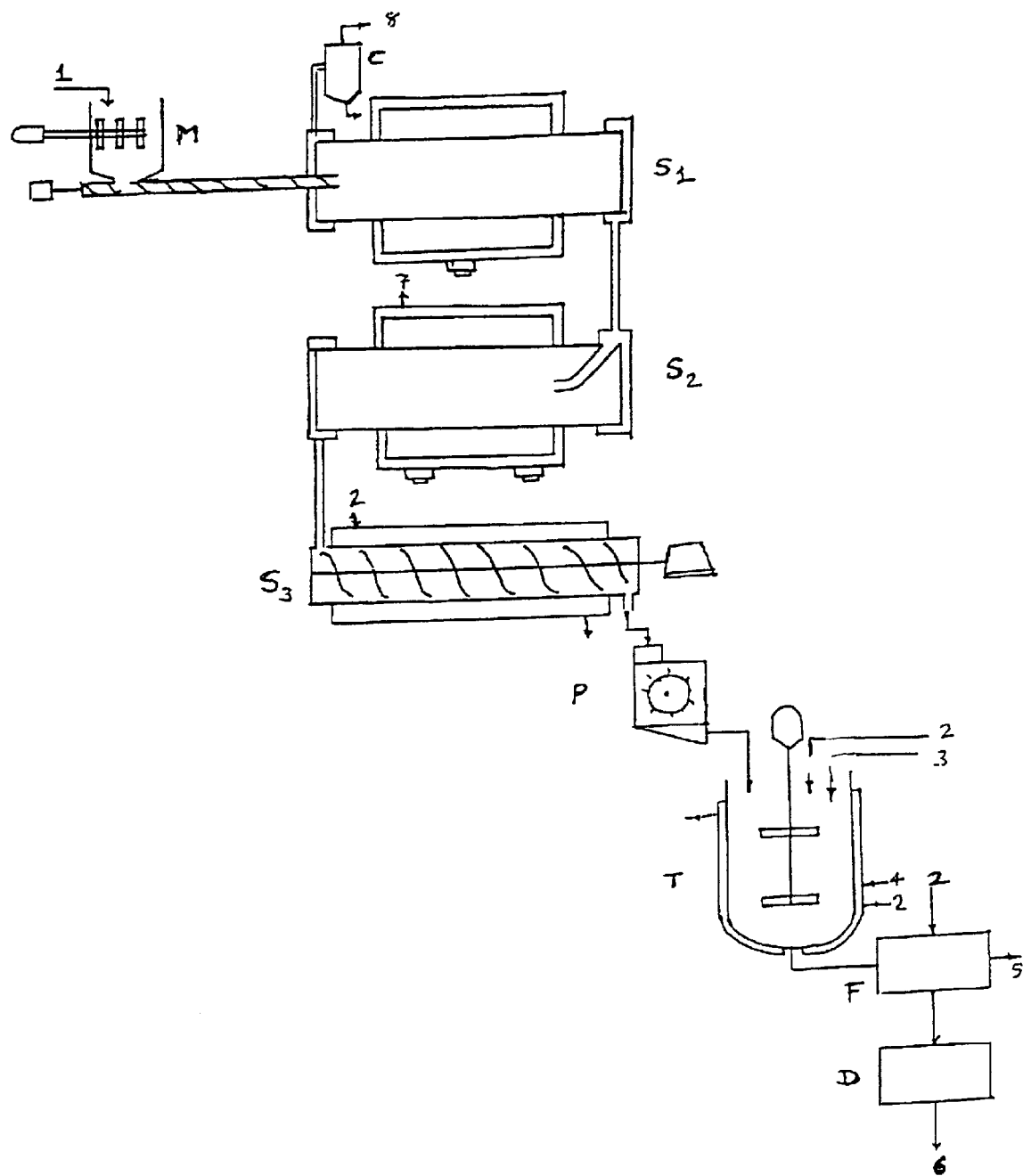
FIG. 1, represents the apparatus used for the heat treatment of calcium carbonate-rich by-product generated in a nitrophosphate fertilizer plant. The unit embodies the following equipments: M-paddle mixer cum screw feeder; $S_1$-Indirect rotary dryer; $S_2$-Indirect rotary drum heater; $S_3$-Jacketed Cooler; P-Ultrafine pulverizer; T-Slurry tank; F-Pressure filter; D-Flash dryer and C-Cyclone/dust collector. The numbers 1 to 8 indicate the following.

1. Calcium carbonate-rich by-product i.e. Feed material.
2. Water
3. Coating agent solution
4. Steam
5. Filtrate
6. Product
7. Flue gases
8. Exhaust gases

DETAILED DESCRIPTION OF THE INVENTION

Accordingly, the present invention provides a process for purification of by-product calcium carbonate generated in industrial processes, specifically in a nitrophosphate fertilizer plant. The process produces high value finely divided calcium carbonate. The process comprises feeding continuously wet calcium carbonate-rich by-product into a rotary dryer. The by-product contains up to 25% moisture and has a particle size from 20 to 150 microns. The by-product is fed at a feed rate from 5 to 20 kg/h, using a screw feeder which is rotated at a speed from 10 to 40 RPM. The rotary dryer, is preheated and maintained at a desired temperature by indirect heating. The dryer is heated to a temperature from 250 to 400° C. to remove moisture up to 25%, and volatile matter (7 to 8%) and to decompose or sublime the ammonium compounds present as impurities (0.1 to 0.3% as ammoniacal Nitrogen). The residence time of the material in the rotary dryer is varied from 20 to 30 minutes by changing the angle of inclination from 1.0 to 1.4 degrees and varying the rotation speed of the dryer from 1 to 4 RPM, thereby varying the material outlet rate from 2.5 to 20 kg/h. The process exhausts the liberated water vapor, volatile matters and ammonia gas from dryer, scrubbing the exhaust gases into a water tank so as to avoid dusting and liberation of ammonia in the area surrounding the plant. The material output from the dryer is transferred into a rotary drum heater through connectors/breachers equipped with a bellow and feed hopper. The rotary drum heater is preheated and maintained at a desired temperature by indirect heating above about 550° C. and below about 650° C. to decompose or sublime the nitrate impurities (from 0.05 to 0.1% as Nitrate Nitrogen). The residence time of the material in the rotary drum heater may be varied from 30 to 90 minutes by changing the angle of inclination from 1.0 to 1.4 degrees and varying rotation speed from 1 to 4 RPM. Liberated gases are removed from the drum heater and scrubbed in a water tank to prevent dusting and $NO_x$ pollution of the surrounding area. The drum heater outlet material is then passed through a water-circulated jacketed screw conveyer type material cooler, so as to obtain the purified material at ambient temperature at an outlet rate that is synchronized with the outlet rate of the rotary drum heater i.e. an outlet rate from 2 to 15 kg/h. Subsequently, the outlet material is subjected to grinding in a pin/attrition mill to a microparticulate size in the range from 1 to 20 microns. The finely divided calcium carbonate is dispersed in a slurry tank so as to obtain a slurry from 40 to 50% solids by weight. The slurry is heated to 85 to 95° C. with agitation, followed by the addition of a hot (from 70 to 90° C.) emulsion or solution of fatty acid derivatives or salts of fatty acid derivatives. The fatty acid derivatives have a carbon chain length from 16 to 20 carbon atoms. The fatty acid derivatives are added in a sufficient amount to obtain from 3 to 4% total fatty matter in the final product. The mixture is allowed to cool to less than 50° C. After cooling, water soluble components are removed from the mixture by known methods and the product is isolated, dried and pulverized to obtain finely divided coated calcium carbonate.

In one embodiment of the present invention, calcium carbonate-rich by-product having a moisture content up to 25% by weight can be used as the starting/feed material. This provides the special advantage of using wet calcium carbonate-rich by-product directly as it is produced by the nitrophosphate fertilizer plant or as it is stored for a longer period in silos. Therefore, the process provided by the present invention can be linked to a nitrophosphate fertilizer plant and made continuous with such a plant.

In another embodiment of the present invention, a calcium carbonate-rich by-product of a nitrophosphate fertilizer plant can be continuously fed at a rate from 5 to 20 kg/h and purified by heat treatment to a level where it can be used as filler in rubber, plastics, paints and PVC.

In yet another embodiment of the present invention, the whiteness/brightness of the product is improved remarkably, from about 85% in a calcium carbonate-rich by-product to greater than 96%, by the heat treatment and micropulverization of calcium carbonate-rich by-product.

In still another embodiment of the present invention, an eco-friendly and continuous process for purifying a calcium carbonate-rich by-product generated in an industrial process, specifically in a nitrophosphate fertilizer plant, is provided wherein a specially designed unit is employed comprising a dryer-heater-cooler arranged in a stack (see FIG. 1) and heated indirectly to avoid dusting and having provision for removing the liberated gases and scrubbing them in water for pollution abatement.

In yet another embodiment of the present invention, moisture up to 25%, volatile matters in the range from 7 to 8% and ammonium compounds varying from 0.1 to 0.3 (as ammonical nitrogen) present in calcium carbonate-rich by-product are removed in a rotary dryer at a temperature from 250 to 400° C.

In yet another embodiment of the present invention, nitrate impurities ranging from 0.05 to 0.1% (as nitrate nitrogen) present in calcium carbonate-rich by-product are removed in a rotary drum heater at a temperature above 550 and below 650° C.

In yet another embodiment of the present invention, the material outlet rate from the rotary dryer and the rotary drum heater may be adjusted from 2.5 to 20 kg/h and from 2 to 15 kg/h respectively by varying the angle of inclination of the rotary dryer and the rotary drum heater from 1.0 to 1.4 degrees and varying the rotation speed from 1 to 4 RPM.

In yet another embodiment of the present invention, the purified and finely divided calcium carbonate is coated using a hot emulsion or solution of fatty acid derivatives or salts of fatty acid derivatives to obtain a product with 3 to 4% total content of fatty acid derivative, which makes it suitable for rubber, paints, plastics and PVC.

In yet another embodiment of the present invention, the purity of the calcium carbonate-rich by-product was improved from 88–90% to 97–98% by removing the impurities through heat treatment.

Calcium carbonate-rich by-product generated in industrial processes, specifically in a nitro-phosphate fertilizer plant, contains 88–90% calcium carbonate, 0.2 to 0.4% total nitrogen, 0.1 to 0.3% ammonical nitrogen, 0.05 to 0.1% nitrate nitrogen, and 1.0 to 0.5% phosphate as $P_2O_5$, 0.20 to 0.25% fluoride as F, 3.5 to 4.0% mixed oxides (aluminium, iron, phosphates and matter insoluble in HCl), 7 to 8% volatile matter, 43 to 45% loss on ignition, 0.10 to 0.15% soluble alkali as $Na_2O$ and 1.0 to 1.2% acid insoluble matter. The pH of a 5% aqueous suspension is from 9–9.3, the tapped bulk density is from 1.30–1.35 g/mL, the brightness/whiteness is 85% and he particle size is from 20 to 150 microns.

Attempts were made to purify the calcium carbonate-rich by-product by methods known in the prior art. Physical methods of separation such as sieving, floatation, sedimentation and hydrocyclone were performed using conventional techniques. Sieve analysis of the dried calcium carbonate-rich by-product was carried out and analyzed for impurities. The −350 mesh fraction contained minimum impurities, but the rejection was 50% of the starting calcium carbonate. Sedimentation and hydrocyclone techniques could not be economically employed due to coarse particle size (20 to 150 microns) and the high density (2.3 to 2.7 g/mL). The froth floatation method using a 10% weight/weight slurry of calcium carbonate-rich by-product with pine oil as a frother and cationic, anionic and non-ionic surface active reagents was also attempted without significant removal of impurities. Washing of the by-product with hot or cold water was also not found useful for the removal of ammonium and nitrate impurities to a desired level. Results obtained in each of these methods showed that the impurities present in the calcium carbonate-rich by-product are an integral part of the calcium carbonate crystals and not physically mixed as is usual for the conventional raw material, limestone.

Conventional chemical treatment methods for leaching the impurities using chemicals as in prior art processes was not fruitful because the chemicals were unable to leach the entrapped impurities. These methods instead dissolved the calcium carbonate.

Therefore, the decision was made to study the effect of heat treatment on calcium carbonate-rich by-product. The material was heated from ambient temperature to 900° C. in a stepwise fashion. At each step, the temperature was increased by 100° C. and maintained at that temperature for one hour. The percentage weight loss in the material was noted at each temperature. All the samples were examined by XRD analysis for percentage crystallinity and to identify the phase present in the heat treated by-product calcium carbonate. The results given in Table 1 show that impurities from calcium carbonate rich by-product are removed by heat treatment up to 600° C. without decomposition of the calcium carbonate.

TABLE 1

| SR. No | Sample | % Weight loss % | Crystallinity | Phase Identified |
|---|---|---|---|---|
| 1. | As such | — | 81 | Calcite |
| 2. | Heated at 100° C., 1 h | 3.60 | 83 | Calcite |
| 3. | Heated at 200° C., 1 h | 5.00 | — | Calcite |
| 4. | Heated at 300° C., 1 h | 5.70 | — | Calcite |
| 5. | Heated at 400° C., 1 h | 6.80 | — | Calcite |
| 6. | Heated at 500° C., 1 h | 9.40 | 67 | Calcite |
| 7. | Heated at 600° C., 1 h | 9.90 | 62 | Calcite |
| 8. | Heated at 700° C., 1 h | 14.50 | 56 | Calcite |
| 9. | Heated at 800° C., 1 h | 47.10 | 0.0 | CaO |
| 10. | Heated at 900° C., 1 h | 47.10 | 0.0 | CaO |

Therefore, in the present invention, purification of calcium carbonate-rich by-product generated in industrial processes, specifically in a nitrophosphate fertilizer plant, is carried out by a heat treatment.

Wet by-product calcium carbonate, containing up to 25% moisture and having a particle size from 20 to 150 microns is fed continuously into a rotary dryer which is preheated and maintained at a desired temperature from 250 to 400° C. by indirect heating. The by-product is fed to the rotary dryer at a feed rate of 5 to 20 kg/h, using a screw feeder which is rotated at the speed from 10 to 40 RPM. During this step, moisture (up to 25%) and volatile matter (7 to 8%) are removed. Ammonium compounds present as impurities from 0.1 to 0.3% (as ammonical Nitrogen) are decomposed or sublimed.

The residence time in the rotary dryer is varied from 20 to 30 minutes by varying the angle of inclination of the dryer from 1.0 to 1.4 degrees and varying the rotation speed of the dryer from 1 to 4 RPM. As a result, the material outlet rate is varied from 2 to 20 kg/h.

The liberated water vapor, volatile matters and ammonia gas in the dryer were blown away from the dryer shell using a blower. The exhaust gases were scrubbed into a water tank so as to avoid dusting and liberation of ammonia in the surroundings of the plant.

The material coming out of the dryer is charged into rotary drum heater, through connectors/breachers equipped with bellow and feed hopper. The rotary drum heater was preheated and maintained at a desired temperature from 550° C. to 650° C. by indirect heating. During this step, the nitrate impurities present in the range 0.05 to 0.1% (as nitrate nitrogen), are either decomposed or sublimed.

The residence time of the material in the rotary drum heater was varied from 30 to 90 minutes by varying the angle of inclination of the drum heater from 1.0 to 1.4 degrees and varying the rotation speed from 1 to 4 RPM. Liberated gases from the drum heater are scrubbed in a water tank to prevent the surroundings from dusting and $NO_x$ pollution.

The drum heater outlet material is passed through a screw conveyer type material cooler that comprises a jacket cooled by water circulation, so as to cool the purified material to ambient temperature at an outlet rate synchronized with the outlet rate of the rotary drum heater i.e. from 2 to 15 kg/h.

Subsequently, the material is subjected to grinding in a pin/attrition mill to a microparticulate size from 1 to 20 microns. The finely divided calcium carbonate is dispersed in a slurry tank so as to obtain a slurry with a solids content from 40 to 50% by weight.

The slurry is heated to 85 to 95° C. with agitation, followed by addition of a hot emulsion or solution of fatty acid derivatives or salts of fatty acid derivatives, in sufficient amount to get 3 to 4% total content of fatty acid derivatives in the final product.

The fatty acids have a carbon chain length from 16 to 20 carbons. The resulting mixture is allowed to cool to less than 50° C. Subsequently, water soluble components are removed from the mixture by known methods, and the product is isolated, dried and pulverized to obtain finely divided coated calcium carbonate having properties as shown in Table 2. The properties of the coated material indicated that it is useful as filler in paints, plastics, rubber and PVC.

TABLE 2

| SR. No. | Property | Results Uncoated | Coated |
|---|---|---|---|
| 1. | Sieve Residue on 150 mesh BSS | NIL | NIL |
| 2. | PH of 5% aqueous suspension | 9.5–10.5 | 9.0–10.0 |
| 3. | Acid insoluble, % | 0.20–0.25 | 0.10–0.15 |
| 4. | Loss on ignition, % | 42–44 | 43–45 |
| 5. | Mixed Oxide, (Fe, Al, Phosphates, silica), % | 3.0–4.0 | 3.0–3.5 |
| 6. | Purity as CaCO3, by Acidimetry, % | 97–98 | 95–97 |
| 7. | Total fatty matter, % | NIL | 2.5–3.5 |
| 8. | Particle size, microns | Less than 20 | Less than 20 |

Table 3 represents particle size distribution curves for dried calcium carbonate-rich by-product, dryer outlet material, calciner/cooler outlet material, finely divided calcium carbonate and coated calcium carbonate, as measured by a Mastersizer-2000 (Malvern, UK), particle size analyser as dry powder.

TABLE 3

| Size ($\mu$m) | Dried raw material | Dryer outlet material | Calciner/ cooler outlet material | Pulverized material | Coated calcium carbonate |
|---|---|---|---|---|---|
| | | | Volume under, (%) | | |
| 2.00 | 0.00 | 0.05 | 0.50 | 17.60 | 3.12 |
| 5.00 | 2.10 | 1.72 | 5.78 | 41.84 | 37.24 |
| 10.00 | 3.20 | 2.03 | 11.10 | 69.52 | 68.91 |
| 20.00 | 14.75 | 11.83 | 19.52 | 99.02 | 97.52 |
| 30.00 | 39.34 | 37.90 | 35.10 | 99.81 | 99.92 |
| 35.00 | 50.00 | 50.10 | 43.03 | 100.00 | 100.00 |
| 40.00 | 62.00 | 62.20 | 51.00 | 100.00 | 100.00 |
| 45.00 | 70.00 | 73.00 | 59.00 | 100.00 | 100.00 |
| 50.00 | 80.00 | 81.30 | 66.50 | 100.00 | 100.00 |
| 60.00 | 88.00 | 90.05 | 73.70 | 100.00 | 100.00 |
| 70.00 | 95.00 | 96.00 | 79.20 | 100.00 | 100.00 |
| 80.00 | 98.00 | 98.00 | 84.50 | 100.00 | 100.00 |
| 105.00 | 99.96 | 100.00 | 88.70 | 100.00 | 100.00 |
| 120.00 | 100.00 | 100.00 | 89.70 | 100.00 | 100.00 |

The process for the production of purified, finely divided and coated calcium carbonate according to the present invention uses a new kind of raw material which is a by-product generated in nitrophosphate fertilizer plant. This material has hitherto not been used for this purpose. This raw material has a particle size from 20 to 150 microns and contain various types of impurities not usually found in the conventionally employed raw material, limestone.

Moisture can be removed by drying the material at 105 to 110° C. for a sufficient period. Generally, the time required for drying decreases with increasing temperature up to a temperature where the material does not decompose.

Ammonium compounds such as $(NH_4)_2CO_3$, $NH_4HCO_3$, $NH_4Cl$, and $NH_4F$ either sublime or decompose at specific temperatures, e.g. ammonium carbonate decomposes at 58° C., ammonium bicarbonate decomposes between 36–60° C. and sublimes, ammonium nitrate decomposes at 210° C. Ammonium chloride and fluoride sublime at about 335° C.

Calcium nitrate (anhydrous) melts at 561° C., $Ca(NO_3)_2.3H_2O$ melts at 51.5° C., $Ca(NO_3)_2 4H_2O$ decomposes at 132° C. Calcium monophosphate decomposes at 203° C., calcium diphosphate decomposes at 25° C., and calcium triphosphate melts at 1670° C. Calcium pyrophosphate $Ca_2P_2O_7$ melts at 1230° C. calcium metaphosphate $Ca(PO_3)_2$ melts at 975° C., and calcium hydroxide decomposes between 580–600° C. to CaO and water.

Aragonite type calcium carbonate decomposes at 825° C., whereas calcite type decomposes at about 895° C. into CaO and $CO_2$. If calcium carbonate is heated to a temperature from about 1000° C., it forms dead burnt/inactive CaO and liberates $CO_2$.

The advantages involved in the process include
(1) Using raw material without pre-drying or crushing.
(2) Keeping the material in free flowing conditions throughout the processing.
(3) Removal of the chemical impurities by thermal treatment.
(4) Improving brightness without using any special reagent.
(5) Calcination of very fine (20 to 150 micron) and highly dense (2.3 to 2.7 g/ml) with minimum dusting.
(6) Avoiding the requirement of special type of material of construction of rotary drum heater by limiting thermal treatment to lower temperature.
(7) Limiting the effect of thermal treatment to impurities without decomposing calcium carbonate.
(8) Arrangement for scrubbing the librated gases to avoid pollution surrounding environment.

The following examples are given by way of illustrations and therefore should not be construed to limit the scope of the present invention.

EXAMPLE 1

The by-product calcium carbonate having 11% moisture content and 85% $CaCO_3$ on a dry weight basis was fed into a rotary dryer at the rate of 10 kg/h. through a screw feeder having a rotation speed of 20 revolutions per minute (RPM) The dryer was preheated at 300° C. with an angle of inclination of 1.4 degrees and a rotation speed of the dryer shell of 2 RPM. The hold-up time was 30 minutes. The material coming out of the dryer was found to have a moisture content between 0.02% and 0.22% by weight. The outlet material was introduced into the second stage of heat treatment in a rotary drum heater, which was preheated to 60° C. by indirect heating. The drum heater was operated with an angle of inclination of 1.08 degrees and a shell rotation speed of 1.5 RPM. The hold up time was 30 minutes. The product was found to have 96% by weight $CaCO_3$, and 3.0% by weight mixed oxides including a $P_2O_5$ content of 1.5% by weight.

EXAMPLE 2

The by-product calcium carbonate having 11% moisture content and 85% $CaCO_3$ on a dry weight basis was fed to a rotary dryer at the rate of 10 kg/h through a screw feeder having rotation speed of 20 RPM. The dryer was preheated to 300° C. and was operated with an angle of inclination of 1.05 degrees and a rotation speed of the dryer shell of 2 RPM. The held hold-up time was 30 minutes. The material coming out of the dryer was found to have a moisture content between 0.02% and 0.22% by weight. The outlet material was introduced into the second stage of heat treatment in a rotary drum heater, preheated to 600° C. by indirect heating. The drum heater was operated with an angle of inclination of 1.08 degrees and a shell rotation speed of 3 RPM. The hold up time was 30 minutes. The product was found to have 96% by weight $CaCO_3$ and 3.0% by weight mixed oxides including $P_2O_5$ content of 1.5% by weight.

EXAMPLE 3

The by-product calcium carbonate having 2.26% moisture and 85% $CaCO_3$ on a dry weight basis was fed to a rotary dryer at a rate of 10 kg/h through a screw feeder having a rotation speed of 20 RPM. The dryer was preheated to 300° C. with the angle of inclination of 1.05 degrees and a rotation speed of the dryer shell of 2 RPM. The hold up time was 30 minutes. The material coming out of the dryer was found to have a moisture content between 0.02% and 0.22% by weight. The outlet material was introduced into the second stage of heat treatment in a rotary drum heater which was preheated to 600° C. by indirect heating and operated with an angle of inclination of 1.08 degrees and a shell rotation speed of 3 RPM. The hold up time was 30 minutes. The product was found to have 96% by weight $CaCO_3$ and 3.0% by weight mixed oxides, including a $P_2O_5$ content of 1.5% by weight.

EXAMPLE 4

The by-product calcium carbonate having a 12.6% moisture content and 85% $CaCO_3$ on a dry weight basis was fed to a rotary dryer at a rate of 5kg/h through a screw feeder having a rotation speed of 6. The dryer was reheated to 300° C. with an angle of inclination of 1.05 degrees and a rotation speed of the dryer shell of 2 RPM. The hold up time was 30 minutes. The material coming out of the dryer was found to have a moisture content between 0.02% and 0.22% by weight. The outlet material was introduced into the second stage of heat treatment in a rotary drum heater which was preheated to 600° C. by indirect heating and operated at an angle of inclination of 1.08 degrees and a shell rotation speed of 3 RPM. The hold up time was 30 minutes. The product was found to have 96% by weight $CaCO_3$ and 3.0% by weight mixed oxides, including a $P_2O_5$ content of 1.5% by weight.

EXAMPLE 5

The by-product calcium carbonate having 18.5% moisture content and 85% $CaCO_3$ on a dry weight basis was fed to a rotary dryer at the rate of 5kg/h through a screw feeder having a rotation speed of 6 RPM. The dryer was preheated to 300° C. with the angle of inclination of 1.05 degrees and a rotation speed of the dryer shell of 2 RPM. The hold up time was 30 minutes. The material coming out of the dryer was found to have a moisture content between 0.02% and 0.22% by weight. The outlet material was introduced into the second stage of heat treatment in a rotary drum heater which was preheated to 600° C. by indirect heating and operated with an angle of inclination of 1.08 degrees and a shell rotation speed of 3 RPM. The hold up time was 30 minutes. The product was found to have 96% by weight $CaCO_3$ and 3.0% by weight mixed oxides, including a $P_2O_5$ content of 1.5% by weight.

EXAMPLE 6

The by-product calcium carbonate having 12.6% moisture content and 85% $CaCO_3$ on a dry weight basis was fed to a rotary dryer at a rate of 8kg/h through a screw feeder having a rotation speed of 6 RPM. The dryer was preheated to 300° C. with an angle of inclination of 1.05 degrees and a rotation speed of the dryer shell of 2 RPM. The hold up time was 30 minutes. The material coming out of the dryer was found to have a moisture content between 0.02% and 0.22% by weight. The outlet material was introduced into the second stage of heat treatment in a rotary drum heater which was preheated to 600° C. by indirect heating and operated with an angle of inclination of 1.08 degrees and a shell rotation speed of 3 RPM. The hold up time was 30 minutes. The product was found to have 96% by weight $CaCO_3$ and 3.0% by weight mixed oxides, including a $P_2O_5$ content of 1.5% by weight. In this example a cooler was also operated with a screw rotation speed of 7 RPM, a cooling water flow rate of 60 LPH, and a cooling water inlet temperature of 24° C. The temperature of outlet material from rotary drum heater was greater then 30° C., and the temperature at the cooler outlet was found to be 34° C.

EXAMPLE 7

The heat treated material obtained in Example 1 was ground using an ultra fine pulverizer and keeping the temperature of the material below 60° C. The ground material had a particle size distribution as shown in FIG. 2(d).

EXAMPLE 8

The ground calcium carbonate obtained in Example 7 was slurried to get a slurry with a solids content of about 50% weight/weight. The slurry was heated to 85° C. with continuous agitation. To this slurry was added an emulsion prepared from stearic acid and sodium hydroxide in such a proportion so as to get 9.5% by weight of stearic acid in the product. The slurry was allowed to cool to 45° C. with continued agitation and thereafter the product was isolated by filtration, washed with water, dried and pulverized. The coated sample was found to have properties as given in Table 2.

The Advantages of the Present Invention are

1. A calcium carbonate-rich by-product generated in an industrial process, specifically in nitrophosphate fertilizer plants, could be purified by simple heat treatment using conventionally used machinery.

2. Calcium carbonate-rich by-product is converted to a value added material suitable for applications in rubber, paint, PVC and plastics.

3. An alternative source to limestone is explored for producing finely divided calcium carbonate useful for commercial applications.

4. Calcium carbonate-rich by-product having a fine particle size from 20 to 150 microns is successfully treated without contributing to the pollution commonly associated with such fine powders due to dusting.

5. A continuous process has been developed according to the present invention which can be linked with a plant generating a calcium carbonate-rich by-product. Thus, the solid waste pollution caused by such by-products is minimized and the environmental quality is improved.

6. Because the temperature of the heat treatment to purify the by-product calcium carbonate is around 600° C., special types of steel are not required to be used in the rotary dryer and drum heater.

7. Heat treatment provides the special advantage of removing all the major impurities simultaneously. Therefore, not many unit operations are required in this purification process.

8. A process is developed for producing a product with improved brightness of calcium carbonate without adding any extra reagent.

What is claimed is:

1. A process for the production of finely divided calcium carbonate from a calcium carbonate-rich by-product, the claimed process comprising:

(a) continuously feeding a wet calcium carbonate-rich by-product into a rotary dryer to remove moisture and volatile matter, and to decompose or sublime ammonium compounds present as impurities in the by-product, to generate a rotary dryer treated material, wherein the calcium carbonate-rich by-product contains up to 25% moisture, has a particle size from 20 to 150 microns, and is fed to the rotary dryer at a feed rate from 5 to 20 kg/h using a screw feeder with a rotation speed from 10 to 40 revolutions per minute; and wherein the rotary dryer is preheated and maintained at a temperature from 250 to 400° C., has an angle of inclination from 1.0 to 1.4 degrees, and has a rotation speed from 1 to 4 RPM;

(b) routing water vapor, volatile matter, and ammonia gas liberated from the calcium carbonate-rich by-product in the rotary dryer to a water tank for scrubbing;

(c) after a residence time in the rotary dryer from 20 to 30 minutes, outputting the rotary dryer treated material at a rate from 2.0 to 20.0 kg/hour to a rotary drum heater to generate a rotary drum heater treated material, wherein the rotary drum heater is preheated and maintained at a temperature from 500 to 600° C., has an angle of inclination from 1.0 to 1.4 degrees, and has a rotation speed from 1 to 4 revolutions per minute;

(d) after a residence time in the rotary drum heater from 30 to 90 minutes, outputting the rotary drum heater treated material to a material cooler to cool to near ambient temperature;

(e) outputting the cooled material from the material cooler at an outlet rate from 2 to 20 kg/hour, which outlet rate is synchronized with the outlet rate for output of the rotary drum heater treated material from the rotary drum heater;

(f) grinding the cooled material in a pin/attrition mill to a particle size from 1 to 20 microns;

(g) dispersing the ground material in a slurry tank to generate a slurry having from 40 to 55% solids content;

(h) heating the slurry to a temperature less than 95° C. with agitation;

(i) adding to the heated slurry a hot emulsion or solution of fatty acid derivatives or salts of fatty acid derivatives to form a mixture, wherein the fatty acid derivatives or salts of fatty acid derivatives have a carbon chain length from 16 to 20 carbons, and are added to the slurry in an amount sufficient to obtain a final product comprising from 3 to 4% of the fatty acid derivative or fatty acid derivative salt;

(j) allowing the mixture to cool to a temperature less than 50° C.;

(k) removing water soluble components from the mixture to generate a product; and (l) drying and pulverizing the product to obtain finely divided coated calcium carbonate.

2. A process according to claim 1, wherein the finely divided calcium carbonate has a purity from 95 to 97%, a particle size of less than 20 microns, a mixed oxide content from 3.0 to 3.5%, an acid insoluble content from 0.01 to 0.15, a loss on ignition of 43 to 45% and a pH of a 5% aqueous solution of 9.0 to 10.0.

3. A process according to claim 1, wherein the rotary dryer is preheated to a temperature from 250° C. to 350° C. by indirect heating.

4. A process according to claim 1, wherein the said rotary dryer angle of inclination is from 1.08 to 1.4 degrees and the rotation speed is from 2 to 3 revolutions per minute.

5. A process according to claim 1, wherein the slurry of ground calcium carbonate is heated to a temperature from 85° C. to 95° C.;

the mixture of the slurry and the fatty acid derivative or salt of a fatty acid derivative is allowed to cool to a temperature from 20 to 45° C.; and the fatty acid derivative is a stearic acid derivative.

6. A process according to claim 1, wherein the rotary drum heater is preheated to a temperature from 550° C. to 600° C. by indirect heating.

7. A process according to claim 1, wherein the residence time of the rotary dryer treated material in the rotary drum heater is from 30 to 45 minutes.

8. A process according to claim 1, wherein the rotary drum heater treated material is passed through a water jacketed material cooler having a screw conveyer rotating at 5 to 15 revolutions per minute to obtain an outlet temperature of the rotary drum heater treated material of less than 35° C.

9. A process according to claim 1, wherein the cooled material is output from the material cooler at a rate from 5 to 15 kg/h.

10. A process according to claim 1, wherein the material that is output from the material cooler is ground to a particle size of from 10 to 20 microns.

* * * * *